United States Patent Office 3,496,105
Patented Feb. 17, 1970

3,496,105
ANION EXCHANGE PROCESS AND COMPOSITION
William M. Le Suer, Cleveland, Ohio, assignor to The Lubrizol Corporation, Wickliffe, Ohio, a corporation of Ohio
No Drawing. Continuation-in-part of application Ser. No. 652,671, July 12, 1967. This application Sept. 20, 1967, Ser. No. 669,305
Int. Cl. C10m 1/54, 1/24
U.S. Cl. 252—33.6        21 Claims

ABSTRACT OF THE DISCLOSURE

Process for reacting anions of acidic materials with basic metal-containing organic complexes whereby the anions are incorporated into the metal-containing complex. For example, the anions of an inorganic acid can be reacted with a basic, carbonated Group II metal-containing complex to incorporate the anions into the reaction product. The products are useful as additives for lubricating oils and liquid hydrocarbon fuels as well as being intermediates for subsequent chemical reactions.

---

This is a continuation-in-part of application Ser. No. 652,671, filed July 12, 1967.

This invention relates to chemical compositions and processes for their preparation. Specifically, the invention is directed to a process of incorporating anions of acidic materials into basic, Group I or Group II metal-containing organic complexes.

According to the present invention, metal-containing compositions are prepared by contacting at least one basic, Group I or Group II metal-containing organic complex with the anions of an acidic material in a suitable medium until at least a portion of the anions react with the Group I or Group II metal. This process is conducted in the presence of at least one peptizing agent.

The metal-containing compositions thus prepared are useful as additives for fuels, lubricants, plastics, and the like. For example, due to their oil-solubility and basic metal content, all of the compositions are useful as detergents in lubricating oil such as employed in internal combustion engine crankcases. Other uses of the product are disclosed hereinafter.

In accordance with the foregoing, it is a principal object of the present invention to provide novel processes for preparing Group I and Group II metal-containing compositions.

Another object of the invention is to provide novel metal-containing compositions.

A further object is to provide novel Group II metal-containing compositions and processes for their preparation.

An additional object is to provide oil-soluble, basic, alkaline earth metal-containing compositions and processes for preparing these compositions.

The manner in which these and other objects of the invention can be achieved is disclosed hereinafter.

The anions used in the process of the present invention are derived from acidic materials corresponding to the formula

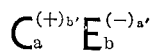

where C and E are the cations and anions, respectively. Obviously, $a:b' = b:a'$ where $a$ and $b$ represent the number of each ion present in the material and $a'$ and $b'$ represent their valences.

The identity of the cation is not particularly critical except to the extent that it influences the solubility of the acidic material. As illustrated hereinafter, the present reaction is usually carried out by forming a solution of the anions and reacting this solution with the solution of the overbased starting material. Thus those cations which contribute to greater solubility are preferred. It is a matter of choice as to whether the anion solution is preformed or prepared in situ. Normally, water is used as a solvent for the acidic material which furnishes the anions, although any substantially inert solvent for these materials is suitable. The cation is preferably $NH_4^+$ or $H^+$ but can also be a metal or an amine cation. Thus, the anions are usually derived from inorganic acids per se, as well as the ammonium, amine, and metal salts thereof. Of the metal salts, the alkali metal salts usually are employed since they are generally water-soluble and most economical. However, other metal salts may be utilized. The $NH_4^+$ or $H^+$ cations are preferred since they are converted into ammonia gas and water during the reaction. These by-products are readily removed. Some of the amine and metal cations form insoluble precipitates which require filtration in order to remove them from the final product.

Similarly, the identity of the anion is not critical insofar as the operability of the process is concerned, although the properties of the final product are influenced thereby.

For example, when the anion is a molybdenum-containing anion such as

the product imparts extreme pressure and antiwear properties to lubricating compositions in addition to detergent properties. The process can be used to incorporate a wide range of anions into overbased materials. It is particularly suitable for use with anions of inorganic acids, preferably the anions of inorganic protonic oxy acids and their corresponding ammonium, amine, and metal salts. Of these, the polyvalent oxy acid anions are especially suitable. The protonic binary acids, such as the hydrohalic acids, are also useful. It will be understood by those skilled in the art that the anions of acids which are not known to exist as such can be employed in the form of their various salts. For example, molybdic acid ($H_2MoO_4$) and tungstic acid ($H_2WO_4$) are not known to exist as such. However, the anions of these acids can be used in the present process by employing the corresponding ammonium, alkali metal, magnesium, or thallous salts. In addition, the various isopoly and heteropoly inorganic acid anions are also suitable for use in the present process. The isopoly molybdates such as paramolybdates are illustrative of the anions derived from isopoly acids while the heteropoly tungstates and molybdates illustrate the heteropoly acid anions. These various anions are derived from acidic materials well known in the art and an extensive discussion thereof can be found in standard chemical tests. See for example, F. A. Cotton and G. Wilkinson, Advanced Inorganic Chemistry, pages 134 through 141, 185–188, 260–265, 394–403, 423–437, 779–790, etc., published by Interscience Publishers, New York, 1962.

Typical acidic materials suitable for providing the anions useful in the present invention include $H_2SO_4$,

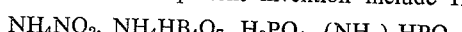

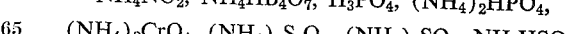

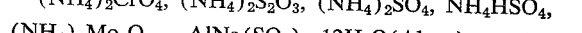

$(NH_4)_6Mo_7O_{24}$, $AlNa(SO_4)_2 \cdot 12H_2O$ (Alum), and the like. Acidic inorganic gases which can be employed include $SO_2$ and $SO_3$. When the gases are employed they are merely bubbled through the reaction mixture or aqueous solutions thereof can be used.

The overbased, Group I and Group II metal-containing intermediates are a well-known class of basic metal-containing compositions which have generally been employed as detergents and dispersants in lubricating oil compositions. These "overbased" intermediates are also referred to in the art as "superbased" or "hyperbased" complexes or salts, basic salts, basic complexes, basic metal complexes, "high-metal containing" salts and complexes, basic complex salts, and the like. The Group II metal-containing intermediates are preferred, particularly the alkaline earth metals.

Overbased materials are characterized by a metal content in excess of that which would be present according to the stoichiometry of the metal and the particular organic compound said to be overbased. Thus, if an oil-soluble monosulfonic acid,

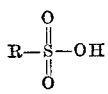

is neutralized with a basic metal compound, e.g., calcium hydroxide, the "normal" metal salt produced will contain one equivalent of calcium for each equivalent of acid, i.e.,

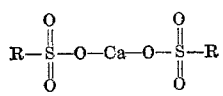

However, various known procedures are available which produce oil-soluble products containing more than the stoichiometric amount of metal. These oil-soluble products are the "overbased" or "basic" complexes employed as intermediates to prepare the metal-containing compositions of the invention.

Applying these procedures, an oil-soluble sulfonic acid or an alkali or alkaline earth metal salt thereof can be reacted with a Group II metal base and the product will contain an amount of metal in excess of that required to neutralize the acid, for example, 4.5 times as much as present in the normal salt, or a metal excess of 3.5 equivalents. The stoichiometric axcess can vary considerably, e.g., from about 0.1 to about 30 or more equivalents depending on the reactants, the process conditions, etc. Usually, overbased products used in preparing the reaction products of the invention will contain from about 0.5 to about 30 excess equivalents of Group II metal per equivalent of the material which is overbased, i.e., a metal ratio of at least 1.5, preferably from about 2.5 to about 15.

The terminology "metal ratio" is used in the prior art and herein to designate the ratio of the total chemical equivalents of the metal in the overbased product to the chemical equivalents of the metal in the product which would be expected to result in the reaction between the organic material to be overbased and the Group II metal based according to the known chemical reactivity and stoichiometry of the two reactants. Thus, in the normal calcium sulfonate discussed above, the metal ratio is one and in the overbased sulfonate, the metal ratio is 4.5.

In the present specification and claims the terms "overbased" and "basic" are used to designate materials containing a stoichiometric excess of metal and are, therefore, inclusive of those materials which have been referred to in the prior art as overbased, basic superbased, hyperbased, etc., as discussed supra.

Generally, these overbased materials are prepared by treating a reaction mixture comprising (a) the organic compound to be overbased, (b) a reaction medium consisting essentially of at least one substantially inert, organic solvent for said organic material, (c) a stoichiometric excess of a metal base, and (d) a promoter with an acidic material. The methods for preparing the overbased products and an extremely diverse group of overbased products are well known in the prior art and are disclosed, for example, in the following U.S. Patents: 2,616,904, 2,616,905, 2,616,906, 2,616,911, 2,616,924, 2,616,925, 2,617,049, 2,695,910, 2,723,234, 2,723,235, 2,723,236, 2,760,970, 2,767,164, 2,767,209, 2,777,874, 2,798,852, 2,839,470, 2,856,359, 2,856,360, 2,856,361, 2,861,951, 2,883,340, 2,915,517, 2,959,551, 2,968,642, 2,971,014, 2,989,463, 3,001,981, 3,027,325, 3,070,581, 3,108,960, 3,147,232, 3,133,019, 3,146,201, 3,152,991, 3,155,616, 3,170,880, 3,170,881, 3,172,855, 3,194,823, 3,223,630, 3,232,883, 3,242,079, 3,242,080, 3,250,710, 3,256,186, 3,274,135, and 3,312,618. These patents disclose typical overbased products useful in preparing the compositions of the present invention and are incorporated herein by reference for their discussion of the processes and materials suitable for preparing overbased products.

The alkaline earth metal overbased products are preferred for use as starting materials. Particularly, barium overbased products are desirable due to the ease with which they enter into the reaction with the anions of the acidic materials.

Organic compounds which can be overbased are generally oil-soluble compounds characterized by an essentially hydrocarbon portion containing at least about 12 aliphatic carbon atoms or at least about 8 aliphatic carbon atoms and one or more aromatic hydrocarbon rings and a polar portion such as an acid group. The hydrocarbon portion may contain polar substituents so long as the hydrophobic (preferably oleophilic) character thereof is not destroyed. The hydrocarbon portion may contain up to 250 or more carbon atoms but generally will contain not more than about 60 carbon atoms. Organic compounds particularly suitable for overbasing are described in more detail below.

Suitable acids include oil-soluble organic acids such as phosphorus acids, thiophosphorus acids, sulfur acids, carboxylic acids, thiocarboxylic acids, and the like, as well as the corresponding alkali and alkaline earth metal salts thereof. Patents 2,616,904, 2,695,910, 2,767,164, 2,767,209, 2,777,874, 3,147,232, and 3,274,135 disclose a variety of overbased products which can be prepared from diverse organic acid starting materials. Overbased acids wherein the acid is a phosphorus acid, a thiophosphorus acid, phosphorus acid-sulfur acid combination, or sulfur acid prepared from polyolefins are disclosed in 2,883,340, 2,915,517, 3,001,981, 3,108,960, and 3,232,883. Overbased phenates are disclosed in 2,959,551 while overbased ketones are found in 2,798,852.

A variety of overbased products prepared from oil-soluble metal-free, non-tautomeric neutral and basic organic polar compounds such as esters, amines, amides, alcohols, ethers, sulfides, sulfoxides, and the like are disclosed, for example in 2,968,642, 2,971,014, and 2,989,463.

The esters are preferably esters of fatty acids having from about 12 to about 30 carbon atoms in the acyl moiety while the alcoholic moiety can be derived from an alcohol of up to 30 carbon atoms. Exemplary alcohols include methanol, ethanol, propanol, sorbitol, pentaerythritol, allyl alcohol, dodecanol, cyclohexanol and the like. Illustrative esters include methyl stearate, cyclohexyl oleate, sorbitol mono-oleate, butyl stearate, cyclohexyl oleate, sorbitol mono-oleate, butyl stearate, ethyl laurate, allyl myristate, ethyl palmitate, diester of ethylene glycol with stearic acid, tetraester of pentaerythritol with oleic acid. Of the esters, the commercially supplied fatty acid and esters are particularly useful because of their availability and cost. Examples of these commercially available products are sperm oil, tall oil, methyl ester of tall oil, and the behenyl ester of tall oil.

Acohols useful in overbased products are exemplified by dodecyl alcohol, octadecyl alcohol, sperm alcohol (obtained by the hydrolysis of sperm oil), behenyl alcohol, oleyl alcohol, and "Oxo" alcohols such as are obtained by the reaction of an olefin having at least 12 carbon atoms with carbon monoxide and hydrogen. They are generally aliphatic alcohols and may contain up to about 30 aliphatic carbon atoms.

Illustrative of the sulfoxides suitable for preparing overbased products are the dialiphatic hydrocarbon sulfoxides of up to about 50 aliphatic carbon atoms such as dodecyl methyl sulfoxide, didodecyl sulfoxide, hexyl octadecyl sulfoxide, dibehenyl sulfoxide, and dioctadecyl sulfoxide. The aliphatic groups each normally will contain up to about 30 aliphatic carbon atoms and the sulfoxide will have a total of at least about 12 aliphatic carbon atoms.

Overbased products can be prepared from primary, secondary, or tertiary aliphatic amines containing at least about 12 aliphatic carbon atoms. Exemplary amines include, for example, dodecylamine, didodecylamine, N-methyl dodecylamine, N-benzyl octadecylamine, dicyclohexylamine, tridecylamine, N-butyl laurylamine, and N,N-dimethyl pentadecylamine. They also include polyamines such as N-octadecyl propylenediamine, N-decylpropylenediamine, tridecyl-substituted diethylenetriamine and octyl-substituted tetraethylenepentamine. The preferred polyamines are N-alkyl-substituted alkylenepolyamines such as the N-alkyl substituted ethylenediamines, trimethylenediamines, tetramethylenediamines, triethylenetetramines, and pentaethylenehexamines. The polyamines may contain one or more N-alkyl substituents. The alkyl group of such N-alkyl-substituted polyamines can contain from about 8 to 40 or more carbon atoms but preferably will have from about 12 to about 30 carbon atoms. Other polyamines having an acyl substituent such as characterizes imidazolines, on one or more of the amino groups are also useful. They are illustrated by the reaction product of one mole of oleic acid with one mole of triethylenetetramine. Still other amines useful herein may be hydroxyalkyl amines, including hydroxyalkyl polyamines, in which the hydroxy alkyl radical has up to about 30 carbon atoms. Normally the hydroxy-alkyl group has up to about 6 carbon atoms. Such hydroxyalkyl amines are formed by the reaction of an epoxide such as ethylene oxide, propylene oxide, or epichlorohydrin with dodecyl amine, N-octadecyl trimethylenediamine, or didecylamine.

Condensation products of the above-identified amines with a lower aliphatic aldehyde, i.e., one having less than about six carbon atoms, constitute a preferred class of overbased products suitable as intermediates in synthesizing the present complexes. Examples of the aldehydes preferred for use herein are formaldehyde (or formaldehyde producing compositions such as paraformaldehyde or aqueous formalin), acetaldehyde, propionaldehyde, butyraldehyde, and the like. The condensation products are readily obtained by mixing one mole of the amine with from about 0.5 to about 5 moles of the aldehyde and then heating the mixture at a temperature from about 50° C. to 240° C. or higher. Where the amine or the aldehyde is a solid, the condensation is best carried out in the presence of a diluent such as mineral oil, xylene, benzene, naphtha, chlorobenzene or other substantially inert solvent. The condensation is promoted by the presence in the reaction mixture of a small amount, at least about 0.01% and usually less than 10% by weight of the aldehyde, of a basic catalyst such as an alkali metal hydroxide or an alkaline earth metal hydroxide, e.g., sodium hydroxide, potassium hydroxide, calcium hydroxide, or barium hydroxide. The precise nature of the condensation products is not known. The condensation products prepared from a mixture of from 2 to 4 moles of formaldehyde or a formaldehyde producing compound (e.g. paraformaldehyde) and about one mole of an N-alkyl alkylenediamine in which the alkyl radical has from about 10 to 40 carbon atoms and the alkylene radical has from 2 to 4 carbon atoms are especially useful in preparing overbased products suitable as intermediates in the preparation of the present metal containing compositions. Barium overbased amine-aldehyde condensation products are particularly preferred.

Another class of materials which can be overbased are the oil-soluble, nitro-substituted aliphatic hydrocarbons, particularly nitro-substituted polyolefins such as polyethylene, polypropylene, polyisobutylene, etc. Materials of this type are illustrated in 2,959,551.

The metal compounds used in preparing the overbased products are usually the basic salts of metals in Group II of the Periodic Table. The anionic portion of the salt can be hydroxyl, oxide, carbonate, hydrogen carbonate, nitrate, sulfite, hydrogen sulfite, halide, amide, sulfate, etc. as disclosed in the above-cited patents. The overbased products are preferably prepared from the alkaline earth metal oxides, hydroxides, and alcoholates. The alkaline earth metal lower alkoxides are the preferred alcoholates.

The promoters, that is, the materials which facilitate the incorporation of the excess metal into the overbased product are also quite diverse and well known in the art as evidenced by the cited patents. A particularly comprehensive discussion of suitable promoters is found in 2,777,874, 2,695,910, and 2,616,904. These include the alcoholic and phenolic promoters which are preferred. The alcoholic promoters include the alkanols of one to about twelve carbon atoms such as methanol, ethanol, amyl alcohol, octanol, isopropanol, and mixtures of these and the like. Phenolic promoters include a variety of alkylated hydroxy-substituted benzenes and naphthalenes. A particularly useful class of phenols are the mono- and dialkylated phenols in which the alkyl substituent contains from about 6 to about 200 carbon atoms. Illustrative phenolic promoters are the heptylphenols, octylphenols, dodecylphenols, nonylphenols, polypropene (M.W. of 150)-substituted phenol, polyisobutene (M.W. of 350)-substituted phenol, cyclohexyl phenol, behenyl phenol. Mixtures of the various promoters are also useful. Water is used in combination with the promoters in some instances to increase their effectiveness.

It should be apparent that the overbased products may retain all or a portion of the promoter. That is, if the promoter is not volatile (e.g., an alkyl phenol) or otherwise readily removable from the overbased material, at least some promoter remains in the overbased product. The presence or absence of the promoter in the overbased material used to prepare the molybdenum-containing complexes does not represent a critical aspect of the invention. Obviously, it is within the skill of the art to select a volatile promoter such as a lower alkanol, e.g., methanol, ethanol, etc., so that the promoter can be readily removed prior to forming the disperse system or thereafter.

Suitable acidic materials are also disclosed in the above cited patents, for example, 2,616,904. The overbased products used as starting materials are preferably prepared using inorganic acidic materials such as HCl, $SO_2$, $SO_3$, $CO_2$, $H_2S$, $N_2O_3$, etc. The overbased products prepared with $CO_2$ are particularly suitable although those prepared with $SO_2$ or $SO_3$ are also very useful. Materials capable of producing the acidic reactants in situ may also be used. For example, urea, carbamates, and ammonium carbonates produce $CO_2$ in situ.

In preparing the overbased products, the compound to be overbased, a substantially inert organic solvent therefor, the metal base, the promoter, and the acidic material are brought together and a chemical reaction ensues. The exact nature of the resulting overbased product is not known. However, it can be adequately described for purposes of the present specification as a single phase homogeneous solution of a Group II metal-containing complex formed from the metal base, the acidic material, and the compound being overbased. Since the overbased products are well-known and as they are used merely as intermediates in the preparation of the molybdenum-containing additives, the exact nature of the products is not critical to an understanding of the present invention.

The temperature at which the acidic material is contacted with the remainder of the reaction mass depends to a large measure upon the promoting agent used. With a phenolic promoter, the temperature usually ranges from about 80° C. to 300° C., and preferably from about 100° C. to about 250° C. When an alcohol or mercaptan is used as the promoting agent, the temperature usually will not exceed the reflux temperature of the reaction mixture and preferably will not exceed about 100° C.

A typical preparation of an overbased product would involve mixing a phenolic promoter, a Group II metal base, and the organic compound to be overbased and treating the mixture with carbon dioxide at a temperature of at least about 50° C., preferably from 80° C. to 250° C. The upper temperature limit is determined by the decomposition point of the reaction mixture. The carbonation is preferably carried out in the presence of a fluid diluent, usually an organic solvent in which the organic compound to be overbased and the product is soluble. Solvents commonly useful for this purpose are substantially inert organic solvents such as benzene, toluene, chlorobenzene, naphtha, dodecane, xylene, mineral oil, and combinations thereof. For purposes of this invention, mineral oil and combinations of at least 50% by weight mineral oil and one or more other solvents are preferred. The amount and type of diluent employed should be selected so that the final overbased product comprises from about 10% to about 70% by weight of the solution.

The amounts of the compound to be overbased and the metal base are such that at least 1.1 equivalents of the latter are used per equivalent of the former. There appears to be no upper limit on the amount of the metal base which may be used in the process. For practical reasons, however, the amount of the metal base seldom exceeds 25 to 30 equivalents per equivalent of the compound being overbased. A greater amount of the metal compound may be used but there appears to be no particular advantage attending such use. Usually, from about 2 to about 15 equivalents of the metal base is used. The overbased materials used as intermediates in the present invention preferably have a metal ratio of at least two.

The equivalent weight of an organic compound which is to be overbased depends upon the number of functional groups in the molecule and the equivalent weight of the metal compound depends upon the valence of the metal and the number of the metal radicals in the molecule. Thus, the equivalent-weight of a phenol is determined by the number of hydroxy radicals attached to the aromatic nucleus; the equivalent weight of a carboxylic acid ester is determined by the number of ester radicals in the molecule; the equivalent weight of an alcohol is determined by the number of hydroxy radicals in the molecule; the equivalent weight of a sulfoxide is determined by the number of sulfoxide radicals in the molecule; the equivalent weight of an amine is determined by the number of amino radicals in the molecule; and the equivalent weight of the condensation product of an amine and a lower aldehyde is determined by the number of the amino nitrogen radicals in the molecule. For instance, the equivalent weight of sperm oil is its molecular weight (as determined by, e.g., its saponification equivalent); that of oleyl alcohol is its molecular weight; that of N-alkyl alkylene diamine is one-half its molecular weight; that of distearyl ester of ethylene glycol is one-half its molecular weight; that of heptylphenol is its molecular weight; that of 2,2'-didecyl-4,4' - methylene-bis-phenol is one-half its molecular weight; that of didodecyl sulfoxide is its molecular weight; that of the condensation product of N-alkyl tetraethylene pentamine and an aldehyde is one-fifth its molecular weight; that of an alkali metal hydroxide is its molecular weight; that of an alkali metal oxide is one-half its molecular weight; and that of an alkaline earth metal oxide or hydroxide is one-half its molecular weight.

It will be noted that where the compound to be overbased is a mixture of two or more compounds capable of being overbased (e.g., organic acid and a phenol), the relative equivalent amount of the metal base to this mixture has reference to the total number of equivalents in the mixture. To illustrate, where the ratio of equivalents of the metal base to a mixture of compounds to be overbased is 2:1 and the mixture comprises a phenol and an other compound capable of being over-based a ratio of equivalents of 1:4, respectively, the reaction mixture will comprise one equivalent of a phenol, 4 equivalents of the other compound, and 10 equivalents of a metal base.

When this reaction mixture is contacted with the acidic material, either in the presence of or in the absence of a diluent, it is usually a heterogeneous mixture. As acidification (e.g. carbonation) proceeds, the metal base becomes solubilized in the organic phase and the carbonated product eventually becomes a homogeneous composition which is readily soluble in hydrocarbon solvents such as benzene, xylene or mineral oil. It is not necessary in most instances that all of the metal base present in the process mixture should be so converted in order to produce a soluble homogeneous product. Such a product is often obtained, for example, when as little as 75% of the metal base is carbonated.

The overbased materials are prepared in a substantially inert organic liquid medium, usually a mineral oil medium. Thus, the overbased starting materials are normally mineral oil solutions of the overbased products although the overbased products can be made in many other organic solvents including aromatic hydrocarbons and halohydrocarbons such as benzene, toluene, xylene, chlorobenzenes; lower boiling petroleum distillates such as kerosene and the various naphthas; the normally liquid aliphatic hydrocarbons and halohydrocarbons such as hexane, heptane, hexene, chlorohexane, and the like. These solvents are used alone or in combination with mineral oil or other natural or synthetic oils. When a combination of oil and one or more of the other solvents is used, the weight ratio of oil to other solvent is generally 1:20 to 20:1. The solutions of the overbased products in any of these solvents can be used in the present process as prepared. Obviously, the amount of solvent can be decreased or increased as desired to facilitate mixing, or to meet some particular requirement for the composition to be prepared, and the like. The solvent serves as a reaction medium when the overbased materials are used in the process of the present invention.

The metal-containing compositions of the invention are complexes which correspond to the empirical formula $R^xM^nA^yE^z$. in this formula R represents an equivalent of an organic hydrophobic group (generally an oleophilic group), M represents an equivalent of a Group II metal, A represents an equivalent of an anion of an inorganic acid, E is an equivalent of the inorganic acid anion which is reacted with the overbased starting material. The superscripts $x$, $n$, $y$, and $z$ represent the number of equivalents of R, M, A, and E present in the complex. The ratio of $n:x$ is at least 2:1, $n$ is at least 2, $x$ and $z$ each are at least 1, and $n$ equals $x+y+z$ with the proviso that $y$ can be 0.

Having discussed the intermediates from which the metal-containing compositions of the invention are prepared, it is now possible to more specifically identify the variables forming the complex. Thus, in the formula $R^xM^nA^yE^z$, R is equivalent to the oil-soluble organic compound, which is overbased to produce the basic starting material, e.g., R—S—O— if a sulfonic acid is overbased. The identity of A depends upon the acidic material used in the overbasing process. For example, if carbon dioxide is used as the acid material, 2 equivalents of A correspond to the Group —O—C—O. Obviously, the identity of E depends on the particular anion used as intermediate in a process. Thus, two equivalents of E could correspond to the groups $SO_4^=$, $MoO_4^=$, $WO_4^=$, etc.

In preparing these complexes, the solution of the overbased Group II metal-containing reactant and the anions are reacted in amounts such that the ratio of equivalents of Group II metal in the overbased reactant to equivalents of anion (an equivalent of an anion is its weight divided by its valence) in the reaction mixture is about 1:0.01 to about 1:5 and preferably 1:0.1 to 1:3. It is not essential that all the anions present actually react and become a part of the complex but the reaction should continue until at least a portion of the anions react with Group II metal. The equivalent ratio of Group II metal to the anions in the resulting complex can vary from about 1:0.01 to about 1:3 and usually from about 10:1 to about 1:1.5. Complexes wherein this ratio is about 1:0.2 to about 1:1 have been found to be very useful as lubricant detergents, smoke suppressants, and the like.

The temperature at which the solution of the overbased product and anions are contacted is not a critical factor in the process. However, a temperature of at least about 20° C. should be employed to avoid an unduly slow reaction and to facilitate mixing, especially where mineral oil or other viscous liquid is used as a solvent for the overbased product. The upper temperature is limited only by the decomposition temperature of the reactants and the products. However, when anions are employed in solution, e.g., aqueous solutions, it may be desirable not to exceed the boiling point of the solvent during the reaction to reduce the solvent loss. Of course, higher temperatures can be employed conveniently in conjunction with superatmospheric pressure or reflux conditions to avoid solvent loss. Obviously, the reaction will proceed even as solvent is lost so solvent conservation is not critical.

When the reaction has proceeded to a desired point, the reaction mass may be filtered and water and other undesired liquids can be readily removed or their amounts reduced by increasing the temperature of the reaction mass and/or lowering the pressure. Normally, water is removed from the reaction product. Reaction temperatures of about 20° C. to about 150° C. are typical and a temperature of about 40° C. to about 95° C. usually provides very good results.

As mentioned supra, the reaction is conducted in the presence of at least one peptizing agent. From the following it will be apparent that the class of peptizing agents contemplated by the present invention can be described as oil-soluble compounds whose molecules are characterized by an oleophilic portion which is essentially hydrocarbon and a polar portion, e.g., a polar group such as carboxylic ester, amide, or imide groups, cyano groups, etc. Suitable peptizing agents include the well-known class of diverse materials used as dispersants in lubricating oils.

The peptizing agent's function is not completely understood. However, it has been found to facilitate the reaction by reducing or eliminating the formation of precipitates and haziness in the product. Moreover, the peptizing agent appears to increase the amount of anion which reacts with the overbased starting material since the anion content of some products prepared in the presence of the peptizing agent is greater than products prepared in the absence of the agent.

The products which function effectively as dispersants in lubricating oils and, hence, also function as peptizing agents in preparing the complexes of the invention, are extremely diverse in nature. Representative peptizing agents, and U.S. patents illustrating them, are the polyglycol substituted polymers disclosed in 2,892,783; polyvinyl alcohols partially esterified with one or more carboxylic acids, 2,951,050; dibenzoates of polyethylene glycols and alkoxyalkylphthalates, 2,956,870; sulfonates of N-substituted propylene diamines, 2,989,387; copolymers of alkylesters of alpha, beta-unsaturated carboxylic acids, esters of alpha, beta-unsaturated carboxylic acids and polyhydroxy alcohols, and, optionally, an alpha-beta-unsaturated monocarboxylic acid, 2,993,032 and 3,001,942; reaction products of mono- and diamines with the anhydrides of partially esterified thiophosphoric acids and a boron acid or anhydride, 3,031,401; sulfonic acid salts of basic nitrogen-containing vinyl polymers, 3,038,857; polymers of alkyl esters of alpha-beta-unsaturated carboxylic acids or fatty acid esters of unsaturated alcohols and an imide of maleic anhydride with a polyalkylene polyamine, 3,048,544; the amine addition products of oil-soluble sulfonic acid, 3,058,910; graft copolymers derived from free-radical polymerizable monomers containing carbon, hydrogen, and oxygen and nitrogen-containing comonomers, 3,067,163; the reaction products of hydrolyzed phosphosulfurized hydrocarbons with amines and boron compounds, 3,089,851; copolymers of alkylacrylates and cyanoalkylacrylates, 3,108,967; polyamides of aliphatic fatty acids and polyamines, 3,110,673; amine salts of thiophosphonic acids, 3,143,506; unsaturated esters of boron acids, 3,152,166; oil soluble copolymers of N-vinyl pyrrolidones and various other ethylenically unsaturated monomers, particularly methacrylic acid esters of higher molecular weight alcohols, e.g., lauryl, cetyl, and stearyl alcohols, British specification 822,620; and the like.

The N-alkyl alkylenediamines and the condensation products thereof with lower aliphatic aldehydes are also suitable peptizing agents. These products are described in more detail above in regard to the organic materials which are suitable for overbasing.

However, the preferred class of peptizing agents is the well-known group of dispersants derived from substituted succinic acids. These are the esters, acidic esters, half esters-half amides, acidic amides, amides, imides, amidines, amine salts, and metal salts of substituted succinic acids wherein the substituent contains at least about 50 aliphatic carbon atoms. The substituent is generally a saturated or unsaturated aliphatic hydrocarbon group although it may contain pendant aryl groups or inert polar groups. However, the polar groups should not be present in sufficiently large numbers to alter the substantially hydrocarbon character of the substituent. Exemplary polar groups include halo, keto, ether, aldehyde, nitro, etc. The upper limit on the number of polar groups is about 10% by weight on the weight of the hydrocarbon portion of the substituent. The hydrocarbon substituent should contain no more than about 5% olefinic linkages based on the total number of carbon-to-carbon covalent linkages present in the substituent. Preferably, the number of olefinic linkages will not exceed about 2%.

The source of the hydrocarbon substituent on the succinic acid moiety of the dispersants includes principally the high molecular weight substantially saturated petroleum fractions and substantially saturated olefin polymers, particularly polymers of monoolefins having from 2 to 30 carbon atoms. The especially useful polymers are the polymers of 1-mono-olefins such as ethylene, propene, 1-butene, isobutene, 1-hexene, 1-octene, 2-methyl-1-heptene, 3-cyclohexyl-1-butene, and 2-methyl-5-propyl-1-hexene. Polymers of medial olefins, i.e., olefins in which the olefinic linkage is not at the terminal position, likewise are useful. They are illustrated by 2-butene, 3-butene, and 4-octene.

Also useful are the interpolymers of the olefins such as those illustrated above with other interpolymerizable olefinic substances such as aromatic olefins, cyclic olefins, polyolefins. Such interpolymers include, for example, those prepared by polymerizing isobutene with styrene; isobutene with butadiene; propene with isopropene; ethylene with piperylene; isobutene with chloroprene; isobutene with p-methylstyrene; 1-hexene with 1,3-hexadiene; 1-octene with 1-hexene; 1-heptene with 1-pentene; 3-methyl-1-butene with 1-octene; 3,3-dimethyl-1-pentene with 1-hexene; isobutene with styrene and piperylene; etc.

The relative proportions of the mono-olefins to the other monomers in the interpolymers influence the stability and oil-solubility of the final products derived from such interpolymers. Thus, for reasons of oil-solubility and stability and the interpolymers contemplated for use in this invention should be substantially aliphatic and substantially saturated, i.e., they should contain at least about 80%, preferably at least about 95%, on a weight basis, of units derived from aliphatic mono-olefins.

Specific examples of such interpolymers include the copolymer of 95% of isobutene and 5% of styrene; the terpolymer of 98% of isobutene with 1% of piperylene and 1% of chloroprene; the terpolymer of 95% is isobutene with 2% of 1-butene and 3% of 1-hexene; the terpolymer of 80% of isobutene with 10% of 1-pentene and 10% of 1-octene; the copolymer of 80% of 1-hexene and 20% of 1-heptene; the terpolymer of 90% of isobutene with 2% of cyclohexene and 8% of propene; and the copolymer of 80% of the ethylene and 20% of propene. The percentages refer to the percent by weight of total interpolymer weight.

Another source of hydrocarbon substituents are saturated aliphatic hydrocarbons, e.g., highly refined high molecular weight white oils or synthetic alkanes such as are obtained by hydrogenation of the high molecular weight olefin polymers illustrated above or other high molecular weight olefins substances.

Olefin polymers having molecular weight from about 750 to about 10,000 are the preferred source of the substituent with those having molecular weight of about 750 to 5000 being especially preferred. Higher molecular weight olefin polymers having molecular weights of from about 10,000 to about 100,000 or more can be used alone or in combination with the lower molecular weight polymers to prepare the substituted succinic acid reactants. Higher molecular weight substituents can impart viscosity index improviding properties to the final product of this invention.

The substituted succinic acids are readily available from the reaction of maleic anhydride with a suitable olefin, olefin polymer, chlorinated hydrocarbon, and the like as described hereinabove. The reaction involves merely heating the two reactants at a temperature of about 100 to 200° C. The product of such a reaction is a succinic anhydride having a large hydrocarbon substituent. The hydrocarbon substituent may contain olefinic linkages which may be converted, if desired, to saturated paraffinic linkages by hydrogenation. The anhydride may be hydrolyzed by treatment with water or steam to the corresponding acid. It will be noted in this regard that the anhydride is equivalent to the acid insofar as its utility in the preparation of the dispersants of this invenion. In fact, the anhydride is often more reactive than the acid and is often preferred.

In lieu of the olefins or chlorinated hydrocarbons, other hydrocarbons containing an activating polar substituent, i.e., a substituent which is capable of activating the hydrocarbon molecule in respect to reaction with maleic acid or maleic anhydride, may be used in the above-illustrated reaction for preparing the substituted succinic acids. Such polar substituents are exemplified by sulfide, disulfide, nitro, mercaptan, halo, ketone, or aldehyde radicals. Examples of such polar-substituted hydrocarbons include polypropene sulfide, di-polyisobutene disulfide, nitrated mineral oil, di-polyethylene sulfide, brominated polyethylene, etc. Another useful method for preparing succinic acids and anhydrides involves the reaction of itaconic acid with a high molecular weight olefin or a polar-substituted hydrocarbon at a temperature usually within the range of from about 100–200° C.

The dispersants prepared from the reaction of polyolefin-substituted succinic acid or anhydride and mono- or poly-amines, particularly polyalkylene polyamines having up to about 10 amino nitrogens, are especially suitable dispersants. The reaction products generally comprise a mixture of amides, imides, amine salt, amidines, etc. The reaction products of polyisobutene-substituted succinic anhydride and polyethylene polyamines containing up to about 10 amino nitrogens are excellent peptizing agents. The substituted succinic acid or anhydride-amine products are disclosed in 3,018,250, 3,024,195, 3,172,892, 3,216,936, 3,219,666, and 3,272,746. Included within this group of dispersants are those products prepared by post-treating the reaction product of the amine and substituted succinic anhydride with carbon disulfide, a boron compound, an alkyl nitrile, urea, thiourea, guanidine, alkylene oxide, and the like as disclosed in 3,200,107, 3,256,185, 3,087,936, 3,254,025, 3,281,428, 3,278,550, 3,312,619; and British specification 1,053,577.

The metal salts of the foregoing substituted succinic acids are disclosed in U.S. Patent 3,271,310. The metal moiety of the salt is preferably a Group I or II metal, aluminum, lead, tin, cobalt, nickel, or zinc.

The esters of the above substituted succinic acid are also very useful peptizing agents. These esters are prepared by reacting acid or anhydride with a mono- or polyhydric alcohol or phenol according to standard procedures for preparing esters of carboxylic acids. Typical esters of this type are disclosed in British specification 981,850, U.S. Patent 3,311,558, and copending application Ser. No. 567,052, filed July 22, 1966. The preferred esters are the esters of the polyolefin-substituted succinic acids or anhydrides in polyhydric aliphatic alcohols containing 2 to 10 hydroxy groups and up to about 40 aliphatic carbon atoms. Such alcohols include ethylene glycol, glycerol, sorbitol, pentaerythritol, polyethylene glycol, diethanol amine, triethanolamine, N,N'-di(hydroxyethyl)-ethylene diamine, and the like. If the alcohol reactant contains reactive amino hydrogens (or if an amine reactant contains reactive hydroxyl groups), it is obvious that a mixture comprising the reaction products of the substituted succinic acid reactant and both the hydroxyl and amino functional groups is possible. Such reaction products can include half-ester, half-amides, esters, imides, and the like. See U.S. Patent 3,324,033.

The peptizing agent can be incorporated into the reaction mixture in an amount of about 1% to about 100% by weight based on the weight of the solution of overbased reactant employed. Normally, from about 3% to about 20% by weight of the peptizing agent will be employed. Since the presence of these peptizing agents is beneficial in the final products, e.g., in lubricating compositions, fuels, etc., the peptizing agent in no way interferes with the use of the resulting complexes. Normally, no attempt is made to isolate the peptizing agent from the complex. Instead, the reaction product including the peptizing agent is utilized as prepared.

The following examples demonstrate typical preparations of overbased compounds which are useful as intermediates in the process of the present invention. Unless otherwise indicated, all percentages and parts are intended to represent percent and parts by weight.

EXAMPLE 1

A mixture of 630 grams (2 equivalents) of a rosin amine (consisting essentially of dehydroabietyl amine) having a nitrogen content of 44% to 245 grams (1.2 equivalents) of heptylphenol having a hydroxyl content of 8.3% is heated to 90° C. and then mixed with 230 grams (3 equivalents) of barium oxide at 90°–140° C. The mixture is purged with nitrogen at 140° C. A portion, 600 grams, of the mixture is diluted with 400 grams of mineral oil and filtered. The filtrate is blown with carbon dioxide, diluted with benzene, heated at the reflux temperature, heated to remove benzene, mixed with xylene and filtered. The filtrate, a 20% xylene solution of the product, has a barium sulfate ash content of 25.1%, a nitrogen content of 2%, and a reflux base number of 119. The "reflux base number" refers to the basicity of the product expressed in terms of milligrams of KOH equivalent to one gram of the composition.

EXAMPLE 2

(a) An amine aldehyde condensation product is obtained as follows: Formaldehyde (420 grams, 14 moles) is added in small increments to a mixture of N-octadecyl propylenediamine (1392 grams, 4 moles), mineral oil (3000 grams), water (200 grams) and calcium hydroxide (42 grams, condensation catalyst) at the reflux temperature, 100°–105° C. The rate of addition of formaldehyde is such as to avoid excessive foaming. The mixture is heated at reflux temperature for one hour, then slowly heated to 155° C., and blown with nitrogen at 150°–155° C. for two hours to remove all volatile components. It is then filtered. The filtrate, 93% of the theoretical yield, is a 65.4% oil solution of the amine-aldehyde condensation product having a nitrogen content of 2.4%. A portion (1850 grams, 3.2 equivalents of nitrogen) is mixed with heptylphenol (185 grams, 0.97 equivalent), mineral oil (1485 grams) and 90% pure barium oxide (1060 grams, 12.6 equivalents) and heated to 70° C. Water (500 grams) is added throughout a one-hour period while maintaining the temperature at 70°–100° C. The mixture is heated at 110°–115° C. for 4.75 hours and then heated to 150° C. Thereafter it is carbonated at 140°–150° C. filtered. The filtrate is 57.8% oil solution of the basic metal composition having a nitrogen content of 0.87% and a barium sulfate ash content of 29.5%.

(b) A product similar to that of (a) but with a lower mineral oil content is made by mixing 1000 parts (by weight) of N-octadecyl propylenediamine, 490 parts of mineral oil, 32 parts calcium oxide, and 143 parts water at about 44° C. and slowly heated to about 102° C. under reflux conditions over a one-hour period. While maintaining the mixture at 100°–105° C., 303 parts of paraformaldehyde are added over three hours. Mixing is continued for another hour under the same conditions and then the mass is heated to about 150° C. over two and one-half hours. Two-hundred-seventy-eight parts of distillate were removed and the residue filtered.

In a separate reaction vessel, a mixture of 197 parts (by weight) mineral oil and 119 parts of hepthylphenol is heated to 93–99° C. While maintaining this temperature, 465 parts of barium hydroxide monohydrate is added over a four-hour period. The temperature is then raised to about 150° C. and 149 parts of the above amine-formaldehyde product is introduced over a one-half hour period. Carbon dioxide is introduced into the mixture via submerged line at 15 parts per hour for 7 hours during which the temperature is maintained at about 150° C. An additional 100 parts of mineral oil is added and this reaction mixture is blown with nitrogen for two hours during which the temperature is regulated at about 150° C. This reduces the water content of the mixture to about 0.3%. Forty parts of a commercial filter aid is added and the mixture filtered. The filtrate is an oil solution of barium overbased amine-formaldehyde condensate containing about 36% by weight mineral oil and having a barium content of 30.8%.

EXAMPLE 3

A mixture of 423 grams (1 equivalent) of sperm oil, 123 grams (0.602 equivalent) of heptylphenol, 1214 grams of mineral oil and 452 grams of water is treated at 70° C. with 612 grams (8 equivalents) of barium oxide. The mixture is stirred at the reflux temperature for one hour and then heated to 150° C. while carbon dioxide is bubbled into the mixture beneath its surface. The carbonated product is filtered and the filtrate has a sulfate ash content of 35%.

EXAMPLE 4

A partially acylated polyamine reactant is prepared as follows. A mixture (565 parts by weight) of an alkylene amine mixture consisting of triethylene tetramine and diethylenetriamine in weight ratio of 3:1 is added at 20°–80° C. to a mixture of equivalent amounts of a naphthenic acid having an acid number of 180 (1270 parts) and oleic acid (1110 parts). The total quantity of the two acids is such as to provide one equivalent for each two equivalents of the amine mixture. The reaction is exothermic. The mixture is blown with nitrogen while it is being heated at 240° C. over 4.5 hours and thereafter heated at this temperature for 2 hours. Water is collected as the distillate. To the above residue ethylene oxide (140 parts) is added at 170°–180° C. over a two-hour period while nitrogen is bubbled through the reaction mixture. The reaction mixture is then blown with nitrogen for 15 minutes and diluted with 940 parts of xylene to a solution containing 25% of xylene. The resulting solution has a nitrogen content of 5.4% and a base number of 82 at pH of 4, the latter being indicative of free amino groups. A portion of the above xylene solution (789 grams, 3 equivalents of nitrogen) is heated to 150° C./2 mm. Hg to distill off xylene and is then mixed with heptylphenol (having a hydroxyl content of 8.3%; 367 grams, 1.8 equivalents). To this mixture there is added 345 grams (4.5 equivalents) of barium oxide in small increments at 90°–111° C. The mixture is heated at 90°–120° C. for 2.5 hours and blown with carbon dioxide for 1.75 hours. It is diluted with 130 grams of xylene, heated at 150° C. for 3.5 hours, and then diluted with an additional 20% of its weight of xylene and filtered. The filtrate has a barium sulfate ash content of 33.2%, a nitrogen content of 3.52%, and a reflux base number of 134.

EXAMPLE 5

A sulfoxide is prepared by treating a polyisobutylene of 750 average molecular weight with 47.5 percent of its weight of $SOCl_2$ for 4.5 hours at 200°–220° C. A mixture of 787 grams (1.0 equivalent) of this sulfoxide, 124 grams (0.6 equivalent) of diisobutyl phenol, 550 grams of mineral oil and 200 grams of water is heated to 70° C. and then treated with 306 grams (4.0 equivalents) of barium oxide. This mixture is heated at reflux temperature for one hour and then treated at 150° C. with carbon dioxide until the mixture is substantially neutral. The resulting mixture is filtered to yield a clear oil-soluble liquid having a barium sulfate ash content of 22.8%.

EXAMPLE 6

To a mixture of 268 grams (1.0 equivalent) of oleyl alcohol, 675 grams of mineral oil, 124 grams (0.6 equivalent) of diisobutyl phenol, and 146 grams of water, at 70° C. there is added 308 grams (4.0 equivalents) of barium oxide. This mixture is heated at reflux temperature for one hour, then at 150° C. while a stream of carbon dioxide is bubbled through the mixture until it is substantially neutral. The thus acidified mixture is filtered and the clear brown oil-soluble filtrate found to have a barium sulfate ash content of 29.8%.

EXAMPLE 7

To a mixture of 500 grams (1.0 equivalent) of polyisobutylphenoxy-ethanol, 124 grams (0.6 equivalent) of heptylphenol, 848 grams of mineral oil and 190 grams of water there is added at 70° C., 306 grams (4.0 equivalents) of barium oxide. This mixture is heated at reflux temperature for an hour at 150° C. while bubbling carbon dioxide beneath the surface for three hours. The carbonated mixture is filtered to yield a liquid product having a barium sulfate ash content of 23.8%.

EXAMPLE 8

To a mixture of 916 grams (2.2 equivalents) of a sulfurized sperm oil, 273 grams (1.3 equivalents) of diisobutylphenol, 1715 grams of mineral oil, and 396 grams of water there is added at 70° C. 833 grams (10.8 equivalents) of barium oxide. This mixture is heated at reflux temperature for an hour and then at 150° C. at which temperature carbon dioxide is bubbled through the mixture until it is substantially neutral. The mixture is filtered to yield a liquid having a barium sulfate ash content of 28.7%.

EXAMPLE 9

To a mixture of 175 grams (1.0 equivalent) of N-octadecyl propylenediamine, 124 grams (0.6 equivalent) of diisobutylphenol, 766 grams of mineral oil, and 146 grams of water there is added 306 grams (4.0 equivalents) of barium oxide and the whole is refluxed for an hour. Water is removed by raising the temperature to 150° C. whereupon carbon dioxide is bubbled through the mixture at this temperature until it is substantially neutral. The mixture is filtered to yield a clear oil-soluble liquid having a barium sulfate ash content of 28.9%.

EXAMPLE 10

To a mixture of 516 grams (2.0 equivalents) of an N-octadecyl propylene diamine-ethylene oxide condensation product, 1776 grams of mineral oil and 360 grams of water there is added 756 grams (9.9 equivalents) of barium oxide. After refluxing this mixture for one hour the temperature is raised to 150° C. and carbon dioxide is bubbled through the mixture until it is substantially neutral. Filtration yields a liquid product having a barium sulfate ash content of 29.6%.

EXAMPLE 11

To a mixture of 408 grams (2 equivalents) of heptylphenol having a hydroxy content of 8.3% and 264 grams of xylene, there is added 383 grams (5 equivalents) of barium oxide in small increments at 85–100° C. and 6 grams of water. The resulting mixture is carbonated at 100°–130° C. and then filtered. The filtrate is heated to 100° C. and subsequently diluted with xylene to a 25% xylene solution. This solution is found to have a barium sulfate ash content of 41% and a reflux base number of 137.

EXAMPLE 12

A 65.4% oil solution of the amine aldehyde condensation product of Example 2(a) (1400 grams, 2.4 equivalents), heptylphenol (140 grams, 0.73 equivalent), and barium oxide (368 grams, 4.78 equivalents) is heated to 70° C. and 250 grams of water added over a one-hour period while maintaining a temperature of 70°–100° C. The mixture is heated at the reflux temperature of 110°–115° C. for four hours and then at 150°–155° C. for 0.5 hour. It is then blown with carbon dioxide at 140°–150° C. and filtered. The filtrate is a 47% oil solution of the desired product and has a sulfate ash content of 27.8%, a nitrogen content of 1.65%, and a reflux base number of 78.

EXAMPLE 13

The procedure of Example 12 is repeated except that the amount of barium oxide used is 1091 grams (14.2 equivalents) and that mineral oil, 1041 grams, is added to the reaction mixture before carbonation. The product is a 50% oil solution and has a barium sulfate ash content of 36.1%, a nitrogen content of 0.83%, and a reflux base number of 168.

EXAMPLE 14

A mixture of polyisobutene (molecular weight of 300)-substituted phenol having a hydroxy content of 3.76% (200 grams, 0.44 equivalent) and hephylphenol having a hydroxy content of 8.3% (200 grams, 0.98 equivalent), and xylene (200 grams) is heated to 80° C. whereupon barium oxide (218 grams, 2.84 equivalents) is added to the mixture in small increments at 80°–104° C. Thereafter, 10 grams of water is added and the resulting mixture is carbonated and nitrogen blown at 148° C. for 2.3 hours. After filtering, the filtrate is heated to 165°/12 mm. Hg and the residue is diluted with xylene solution. The xylene solution is found to have a barium sulfate ash content of 36.7% and a reflux base number of 171.

EXAMPLE 15

A mixture of 65.4% mineral oil solution of the amine-aldehyde condensation product of Example 2 (1400 grams, 2.4 equivalents), heptylphenol (281 grams, 1.46 equivalents), mineral oil (1636 grams) barium oxide 893 grams, 11.6 equivalents) is heated to 70° C. Water (500 grams) is added in one hour as 70°–110° C. The mixture is heated at reflux temperature (110°–115° C.) for 4 hours, dried by heating it to 150° C. and then at 145°–150° C. for 0.5 hour. It is blown with carbon dioxide at 145°–150° C. until it is substantially neutral to phenolphthalein and then filtered. The filtrate is a 58% oil solution of the product and has a barium sulfate ash content of 27.3% and a reflux base number of 126.

EXAMPLE 16

A mixture of 520 parts (by weight) of a mineral oil, 480 parts of a sodium petroleum sulfonate (molecular weight of 480), and 84 parts of water is heated at 100° C. for 4 hours. The mixture is then heated with 86 parts of a 76% aqueous solution of calcium chloride and 72 parts of lime (90% purity) at 100° C. for 2 hours, dehydrated by heating to a water content of less than 0.5%, cooled to 50° C., mixed with 130 parts of methyl alcohol, and then blown with carbon dioxide at 50° C. until substantially neutral. The mixture is then heated to 150° C. to distill off methyl alcohol and water and the resulting oil solution of the basic calcium sulfonate filtered. The filtrate is found to have a calcium sulfate ash content of 16% and a metal ratio of 2.5. A mixture of 1305 grams of the above carbonated calcium sulfonate, 930 grams of mineral oil, 220 grams of methyl alcohol, 72 grams of isobutyl alcohol, and 38 grams of amyl alcohol is prepared, heated to 35° C., and subjected to the following operating cycle four times: mixing with 143 grams of 90% calcium hydroxide and treating the mixture with carbon dioxide until it has a base number of 32–39. The resulting product is then heated to 155° C. during a period of 9 hours to remove the alcohols and then filtered through a siliceous filter-aid at this temperature. The filtrate has a calcium sulfate ash content of 39.5%, and a metal ratio of 12.2.

EXAMPLE 17

A basic metal salt is prepared by the procedure described in Example 16 except that the slightly basic calcium sulfonate having a metal ratio of 2.5 is replaced with a mixture of that calcium sulfonate (280 parts by weight) and tall oil acids (970 parts by weight, having an equivalent weight of 340) and that the total amount of calcium hydroxide used is 930 parts by weight. The resulting highly basic metal salt of the process has a calcium sulfate ash content of 48%, a metal ratio of 7.7, and an oil content to 31%.

EXAMPLE 18

A highly basic metal salt is prepared by the procedure of Example 17 except that the slightly basic calcium sulfonate starting material having a metal ratio of 2.5 is replaced with tall oil acids (1250 parts by weight, having an equivalent weight of 340) and the total amount of calcium hydroxide used is 772 parts by weight. The resulting highly basic metal salt has a metal ratio of 5.2, a calcium sulfate ash content of 41%, and an oil content of 33%.

The following examples illustrate the process and typical reaction products of the present invention.

Example I (A) A peptizing agent is prepared by reacting in oil polyisobutene(molecular weight 750)-substituted succinic anhydride with a commercial mixture of polyethylene polyamines having an average composition corresponding to that of tetraethylene pentamine (reacted in a ratio of equivalents of 1:1 according to the procedure of U.S. Patent 3,172,892, e.g., Example 12 thereof). The oil content of the product is adjusted so that oil comprises about 40% by weight of the peptizing agent.

To a mixture of 2,285 grams of the overbased product of Example 2(b) and 125 grams of the above-prepared peptizing agent, there is added slowly over three hours 2600 grams of an aqueous solution of ammonium paramolybdate tetrahydrate (prepared by mixing 1300 grams of the molybdate and 1300 grams of water) while maintaining a temperature slightly above 70° C. The weight ratio of peptizing agent to overbased product is 5:95 and the barium to molybdenum molar ratio of 1:1.47. Ammonia, carbon dioxide, and water are evolved during the ensuing reaction. Thereafter, nitrogen is bubbled through the reaction mass to remove water and gases during which time the product is heated to 170° for four hours. Then the mass is filtered. The filtrate weighs 2,710 grams and contains 20.2% molybdenum, 21.6% barium, and 25.3% oil.

(B) To a mixture of 24 grams of water, 457 grams of the product of 2(b), and 25 grams of the peptizing agent of II(A) preheated to 90° C., there is added 51 grams of commercial ammonium molybdate powder (ammonium dimolybdate) sold by the Climax Molybdenum Company having a composition corresponding to the formula $(NH_4)_2Mo_2O_7$ and a molybdenum content of 56.5% by weight. The mixture is maintained at this temperature for several hours with constant agitation of the mass. After drying at 170° C. and filtering, a filtrate is obtained comprising 5.5% molybdenum. The barium to molybdenum molar ratio in the reaction mixture is 1:0.3 and the weight ratio of overbased product to peptizing agent is 95:5.

Example II (A) A mixture of 1000 parts by weight of polyisobutene having a molecular weight of about 1000 and 90 parts by weight of phosphorus pentasulfide is heated to about 260° C. over five hours and thereafter maintained at that temperature for an additional five hours in an atmosphere of nitrogen. The reaction mass is then cooled to 150° C. and blown with steam for 5 hours. The resulting phosphosulfurized-hydrolyzed material has a phosphorus content of 2.35% and a sulfur content of 2.75%.

A suspension of 311 parts by weight of barium hydroxide in 485 parts of mineral oil is heated to 140–150° C. and 300 parts of the phosphosulfurized-hydrolyzed product prepared above is added over a one-hour period. To the resulting mixture there is added over a one-half hour period 153 parts of heptylphenol. The resulting mixture is then blown with carbon dioxide for 2.3 hours while maintaining a temperature of 150–155° C. Subsequently, 181 parts of barium hydroxide are added to the mass over a 30-minute period and the carbonation is resumed. An additional 181 parts of barium hydroxide is added at the end of 2 hours and carbonation is continued for an additional two and one-half hours. Thereafter a 274 parts of mineral oil are added and the resulting solution is dried by blowing nitrogen therethrough while maintaining the temperature of the mass at 150° C. After filtration, mineral oil is added to dilute the solution to a barium sulfate ash concentrate of 38.5%. The product thus obtained is a phosphorus content of 0.35%, a sulfur content of 0.38%, a reflux base number of 168, and a metal ratio of 14.2.

A mixture of 1226 grams of the product produced above and 1226 grams of the peptizing agent described in I(A) is formed and heated to about 85° C. To this mixture there is added an aqueous ammonium paramolybdate solution (prepared by mixing 353 grams of the ammonium paramolybdate tetrahydrate of Example I and 353 grams of water). The molybdate solution is added over about a 40-minute period. The resulting mixture is maintained at about 90° C. for 4 hours. Thereafter, the reaction mixture is heated to about 170° C. for 3 hours and filtered. The filtrate weighs 2,416 grams and comprises 42.1% mineral oil, 10.4% barium, 6.39% molybdenum, and 0.17% phosphorus.

(B) A substituted succinic acid ester of pentaerythritol is prepared by reacting polyisobutenyl(molecular weight—about 750)-substituted succinic anhydride and pentaerythritol in a molar ratio of 1:1 at a temperature of about 190–200° C. while blowing the reaction mass with nitrogen gas at the rate of about 10 parts by weight per hour. Three hundred forty-two parts by weight mineral oil is used as the reaction medium. Thereafter, an additional 113 parts by weight of mineral oil is added and the entire mass is filtered producing a filtrate comprising about 40% by weight oil. The ester contained in the filtrate is an excellent peptizing agent.

Following the procedure of II(A), 1839 grams of the phosphosulfurized-hydrolyzed product of (A), 460 grams of the oil-solution of the substituted succinic acid ester of pentaerythritol as produced above, and 1058 grams of an ammonium molybdate solution (produced by mixing 529 grams of ammonium paramolybdate tetrahydrate and 529 grams of water) are reacted. The reaction mixture thus produced contains a weight ratio of peptizing agent to overbased material of 20:80 and a molar ratio of barium to molybdenum of 1:1. After filtration, 1448 grams of an oil solution of the desired molybdenum-containing complex is obtained as the filtrate. The filtrate contains 4.8% barium and 3.19% molybdenum.

Example III (A) To a mixture of 1820 grams of the product of Example 2(b) and 96 grams of the peptizing agent described in Example II(B), there is added 2120 grams of ammonium molybdate solution prepared by mixing 1060 grams each of water and ammonium paramolybdate tetrahydrate. The molybdate solution is added over a one-hour period while maintaining the temperature at about 75–85° C. Thereafter, the reaction mixture is dried by heating to about 170° C. while blowing with nitrogen for 3.5 hours to remove water, ammonia, and carbon dioxide. The reaction product is filtered at a temperature of 150° C. The filtrate contains 21.53% barium and 20.5% molybdenum. The ratio of peptizing agent to overbased material in the reaction mixture is 5:95 and the molar ratio of barium to molybdenum is 1:1.5.

(B) A peptizing agent is prepared according to U.S. Patent 3,200,107 (e.g., Example 9 thereof, etc.) by reacting polyisobutene(molecular weight—1000)-substituted succinic anhydride (1.5 equivalents) with about 3 equivalents of a commercial mixture of polyethylene polyamines having an average composition of tetraethylene pentamine by heating the mixture to about 150° C. over a 6-hour period and thereafter blowing it with nitrogen for an additional 5 hours. Thereafter, 1.5 equivalents of carbon disulfide is added over a one-hour period while maintaining the temperature in the range of about 140°–150° C. The resulting mixture is heated an additional hour and then blown with nitrogen for 3 hours and filtered. (See Example 9 of 3,20,107.)

To a reaction mixture of 1820 grams of the product of Example 2(b) and 320 grams of a 40% by weight oil solution of the above described peptizing agent there is added 708 grams of ammonium paramolybdate tetrahydrate dissolved in an equal amount of water while maintaining a temperature of about 82° C. This temperature is maintained for about 5 hours. Subsequently, the reaction mixture is heated to about 107° C., nitrogen gas is bubbled through the reaction mixture. Thereafter the mixture is filtered. The filtrate contains 21.5% barium and 15.35% molybdenum. The weight ratio of peptizing agent to overbased organic compound in the reaction mixture is 15:85 and the molar ratio of barium to molybdenum is 1:1.

(C) A peptizing agent is prepared as in Example I(A) with the exception that 2 equivalents of the amine mixture are reacted with each equivalent of the substituted succinic acid anhydride.

Following the procedure of Example IV(A), 1820 grams of the product of Example 2($b$), 96 grams of a 41% oil solution of the above described peptizing agent, and 2120 grams of an aqueous solution of ammonium molybdate (prepared by mixing 1060 grams each of ammonium paramolybdate tetrahydrate and water) are reacted to produce a molybdenum-containing complex. The resulting filtrate contains 21.08% barium and 20.99% molybdenum. The weight ratio of peptizing agent to overbased organic starting material is 5:95 and the molar ratio of barium to molybdenum is 1:1.5.

Example IV

An amine aldehyde condensation product is prepared according to Example 2($b$) by reacting a mineral oil solution of N-octadecyl propylene diamine with formaldehyde in the presence of calcium oxide as the condensation catalyst. The resulting amine-formaldehyde condensation product is an effective peptizing agent.

A mixture comprising 674 grams of a calcium overbased petrosulfonic acid having a metal ratio of 12.2 and 225 grams of the oil solution of the amine-aldehyde condensation product identified above is heated to about 100° C. Thereafter, an ammonium molybdate solution (prepared by dissolving 354 grams of ammonium paramolybdate tetrahydrate in 354 grams of water is added to the mixture over a period of one hour while maintaining the reaction mixture at between 80° and 95° C. This reaction mixture is characterized by a ratio of peptizing agent to overbased petrosulfonate of 25:75 and a molar ratio of calcium to molybdenum of 1:1. The reaction mixture is maintained at a temperature of about 95° C. for about four hours and thereafter heated slowly to 170° C. while bubbling nitrogen through the reaction mass. These conditions are maintained for about four hours and the reaction mass subsequently filtered. The oil solution of the molybdenum-containing complexes thus produced is characterized by a calcium content of 2.47% and a molybdenum content of 5.81%.

Example V

A mixture of 1371 grams of the product of 2($b$) and 344 grams of the peptizing agent of Example I(A) is warmed to 65° C., producing a weight ratio of peptizing agent to overbased material of 20:80. To this mixture there is added 730 grams of powdered sodium molybdate dihydrate ($Na_2MoO_4 \cdot 2H_2O$) and 347 grams of water resulting in a molar ratio of barium to molybdenum of 1:1. This mixture is held at 100°–110° C. for 8.5 hours, subsequently dried under a vacuum at 150° C., and filtered. The filtrate contains 23.3% barium and 1.0% molybdenum.

Example VI (A) A mixture comprising 476 grams of an oil solution of the overbased material of Example II(A) and 26 grams of the peptizing agent of Example IV is formed. To this mixture there is added slowly 152 grams of a 50% aqueous solution of sulfuric acid. An exothermic reaction ensues accompanied by the evolution of carbon dioxide. During the acid addition, nitrogen gas is bubbled through the reaction mass. The reaction mass is then heated to 160° C. over a 1.25-hour period and filtered. The filtrate weighs 461 grams, has a sulfate ash content of 34.0%, a $CO_2$ content of 0.27%, and a sulfur content of 4.80%.

(B) The procedure of VI(A) is followed with the exception that the weight ratio of the solution of overbased material to peptizing agent is 90:10 instead of 95:5. The product has a sulfate ash content of 32.7% and a sulfur content of 4.35%.

(C) The procedure of VI(A) is followed using the weight ratio of the solution of overbased starting material to peptizing agent of 85:15. The filtrate has a sulfate ash content of 31.2%, a $CO_2$ content of 0.49%, and a sulfur content of 4.56%.

(D) The procedure of VI(A) is followed using a weight ratio of overbased starting material to the peptizing agent of Example I(A) of 50:50. The filtrate contains 2.76% sulfur and has a sulfate ash content of 18.6%.

Example VII (A) To a mixture of 267 grams of an oil solution of a carbonated, calcium overbased carboxylic acid having a calcium sulfate ash content of about 52% and a calcium content of about 15% (prepared from a commercial mixture of oil-soluble carboxylic acid consisting mainly of oleic acid following the general procedure of Example XVIII, 267 grams of the peptizing agent of Example I(A), and 200 grams of xylene maintained at 50° C., there is added very slowly over a three-hour period 174 grams of a 50% aqueous solution of sulfuric acid. An exothermic reaction takes place with the rapid evolution of carbon dioxide. Nitrogen gas is bubbled through the reaction mixture during the acid addition. The mixture is then heated to about 170° C. under reduced pressure to remove water and xylene and subsequently filtered. The filtrate has a sulfate ash content of about 30% and contains 6.9% calcium, 5.2% sulfur, and 0.12% $CO_2$.

(B) The procedure of (A) is followed with a weight ratio of overbased material to peptizing agent being 90:10. The filtrate has a sulfatae ash content of 40%, a sulfur content of 8.24%, and a $CO_2$ content of 0.17%.

Example VIII

A mixture comprising 1800 grams of a 30% mineral oil solution of a carbonated barium overbased di-polyisobutenyl (M.W. 300)-substituted phenol thioether (barium sulfate ash content, 34.7%; 5.27%, $CO_2$; and 1.07%, sulfur) and 200 grams of a peptizing agent of Example IV is formed and 441 grams of 50% aqueous sulfuric acids slowly added over a 1.8-hour period while blowing nitrogen through the mixture. The mixture is then heated to 155° C. over a three-hour period and filtered. The filtrate is an oil solution of the desired complex and has a sulfate ash content of 29.5%, a sulfur content of 4.11%, and a $CO_2$ content of 0.67%.

Example IX

Following the procedure of Example VIII, 1750 grams of an oil solution of a carbonated, barium overbased petrosulfonic acid (barium sulfate ash content, 38.5%; sulfur content, 1.45%; and barium content, 22.25%) and 309 grams of the same peptizing agent are reacted with 590 grams of 50% aqueous sulfuric acid. The filtrate has a sulfate ash content of 30.4% and a sulfur content of 5.24%.

Example X

A barium overbased nitrated polyisobutene is prepared by nitrating 500 parts (by weight) of polyisobutene (M.W.—1000) with 62.5 parts of 67% aqueous nitric acid at 65–70° C. for eleven hours. The nitrated polyisobutene has a nitrogen content of 1.3%. To a mixture of 350 parts of the product 933 parts of mineral oil, 130 parts of heptyl phenol, there is added 622 parts of barium oxide at 60°–100° C. over 2.5 hours. The mixture is agitated at 130° C. for 1.5 hours and blown with steam and carbon dioxide until it is substantially neutral to phenolphthalein indicator. Subsequently, the mixture is heated for 2.5 hours at 150° C. and then blown with nitrogen at this temperature for 1.0 hour at reduced pressure. After filtration, the filtrate is diluted with mineral oil to a 53% oil solution having a sulfate ash content of 38.3%.

Eight hundred grams of the above-overbased product and 278 grams of a 50% aqueous sulfuric acid solution are reacted in the presence of 143 grams of the peptizing agent of Example IV following the procedure of Example III. The filtrate has a sulfate ash content of 30.3%, a sulfur content of 4.36%, and a nitrogen content of 0.39%.

Example XI

Seven hundred grams of a barium overbased polyisobutenyl (M.W.—750)-substituted succinic anhydride having a barium sulfate ash content of 33% (prepared by carbonating a mixture of the anhydride and barium oxide in the presence of heptylphenol), 123 grams of the peptizing agent of Example IV, and 132 grams of 50% aqueous sulfuric acid are reacted according to the procedure of Example VIII. The filtrate thus obtained has a sulfate ash content of 27.3%, a sulfur content of 2.54%, and a barium content of 15.8%.

Example XII

To a mixture of 300 grams of a commercially available magnesium overbased petrosulfonic acid, 54 grams of the peptizing agent of Example IV, and 299 grams of xylene, there are added 160 grams of 50% aqueous sulfuric acid over a 2-hour period. The mixture is heated to 150° C. for two hours while blowing with nitrogen and subsequently filtered. The filtrate has a sulfate ash content of 22%, a magnesium content of 5.05%, and a sulfur content of 7.39%.

EXAMPLE XIII

Following the procedure of Example XII, 500 grams of strontium overbased petrosulfonic acid, having a strontium sulfate ash content of 19.4%, and 81 grams of the sulfuric acid solution are reacted in the presence of 90 grams of the peptizing agent. The filtrate has a sulfate ash content of 16%, a strontium content of 7.76%, a sulfur content of 2.75%, and a $CO_2$ content of 0.53%.

By substituting equivalent amounts of anions derived from other acids or acid salts described hereinbefore for those anions utilized in the foregoing examples, other embodiments of the processes and products of the type contemplated by the present invention will be readily apparent to those skilled in the art. Similarly, other overbased starting materials, such as previously discussed in detail above, can be substituted for the overbased materials in these examples.

The foregoing examples demonstrate one of the reasons that ammonium molybdates are particularly useful in preparing the complex products of this invention, particularly where the overbased material is a carbonated product. During the reaction between the overbased starting material and the anions, carbonate is displaced by the anions (e.g., $SO_4^=$, $MoO_4^=$, $PO_4^\equiv$, etc.) and ammonia and carbon dioxide are evolved. The evolution of these by-products as gases facilitates the preparation of the desired complexes. If the cation of the anion-containing reactant is one which forms an oil-insoluble product, a haze or precipitate can form which may have to be filtered from the reaction product for some applications of the materials. As noted above, the peptizing agents assist in minimizing or eliminating hazes, etc.

The reaction products of the invention can be employed in lubricating oils and greases in various amounts to improve the dispersant/detergent capabilities. Usually, they will be employed in amounts such that the reaction products, including the oil or other medium and the peptizing agents, will comprise from about 0.001% to about 25% by weight of the final lubricating composition. Preferably, however, the products of the invention are utilized in amounts of about 0.01% to about 10% by weight in the final lubricating composition.

The reaction products of this invention will ordinarily be used in combination with other lubricant additives usually found in lubricating oils and greases. Such additives include, for example, detergents of the ash-containing type, ashless detergents or dispersants, viscosity index improving agents, pour point depressants, rust inhibiting agents, anti-foam agents, and oxidation and corrosion inhibitors and the like. These other additives are discussed in detail in the patents and publications discussed above.

The ash-containing detergents are exemplified by oil-soluble neutral and basic salts of alkali or alkaline earth metal with sulfonic acids, carboxylic acids or organic phosphorus acids characterized by at least one direct carbon-to-phosphorus linkage (such as those prepared by the treatment of an olefin polymer, e.g., polyisobutene having a molecuar weight of 1000, with a phophorizing agent such as phosphorus trichloride, phosphorus heptasulfide, phosphorus pentasulfide, phosphorus trichloride and sulfur, white phosphorus and a sulfur halide, or phosphorothioic chloride). The most commonly used salts of such acids are those of sodium, potassium, lithium, calcium, magnesium, strontium, and barium. The basic salts of such compounds are those described above wherein the number of equivalents of metal is present in a stoichiometrically larger amount than the number of equivalents or organic radicals. The commonly employed methods for preparing the basic salts involves heating a mineral oil solution of an acid with a stoichiometric excess of a metal neutralizing agent such as the metal oxide, hydroxide, carbonate, bicarbonate, or sulfide at a temperature above 50° C. and filtering the resulting mass as explained hereinbefore with regard to the preparation of the overbased materials suitable for preparing the molybdenum-containing complexes.

The ashless detergents useful in lubricating oil compositions have been described in detail hereinbefore in regard to the peptizing agents useful in preparing the products of the invention.

Example of oxidation-inhibitors, corrosion-inhibitors, and other extreme pressure agents include benzylidisulfide bis-(chlorobenzyl)disulfide, dibutyltetrasulfide, sulfurized methyl ester of oleic acid, sulfurized alkylphenol, sulfurized dipentene, sulfurized terpene, sulfurized Diels-Alder adducts such as the adduct of butadiene and butylacrylate, phosphosulfurized hydrocarbons such as the reaction product of a phosphorus sulfide with turpentine or methyloleate, phosphorus esters including principally dihydrocarbon and trihydrocarbon phosphites such as dibutylphosphite, diheptylphosphite, dicyclohexylphosphite, pentylphenylphosphite, dipentylphenyl phosphite, tridecylphosphite, distearylphosphite, dimethylnapthylphosphite, polypropylene(molecular weight 500)-substituted phenylphosphite, diisobutyl-substituted phenylphosphite, metal thiocarbonates such as zinc dioctyl-dithiocarbonates and barium heptylphenyl ditthiocarbonate, Group II metal phosphorodithioates such as zinc dicyclohexylphosphorodithioates, zinc dioctylphosphorodithioate, barium di(heptylphenyl) - phosporodithioate, cadmium dinonylphosphorodithioate, zinc salts of phosphorodithioic acids produced by the reaction of phosphorus pentasulfide with an equimolar mixture of isopropyl alcohol and n-hexyl alcohol, and the lead phosphorodithioate salts corresponding to the foregoing metal phosphorodithioates.

As is well known, the amount of each additive to be employed in a given composition can vary widely. Thus, depending on the particular use of the lubricating composition and the type of additive under consideration, the additives will be employed in amounts ranging from about 0.001% to about 20% by weight of the lubricating composition. Thus, in an internal combustion engine crankcase lubricating oil, the amount of detergent and/or dispersant may vary from about 0.1% to about 10% by weight. The conventional E.P. agents and anti-wear additives ("oiliness," "lubricity," and "film strength" additives as they are sometimes called) can be employed in amounts of from about 0.01% to about 10% or more by weight depending on the nature of the additive and the environment in which the lubricant must function.

An illustrative lubricating composition for use in the crankcase of an internal combustion engine would be an SAE 20 mineral lubricating oil containing 2% (by weight) of a dispersant produced by reacting a polyisobutenyl (M.W.—750)-substituted succinic anhydride with a polyethylene polyamine mixture in an equivalent ratio of anhydride to amine of 1:1, 0.07% of phosphorus as zinc dioctylphosphorodithioate, 2% of a barium detergent prepared by neutralizing the hydrolyzed product of phosphosulfurized polypropylene, 3% of a carbonated, barium overbased mahogany acid (metal ratio, 6), 3% of the copolymer of decyl-methacrylate and diethylaminoethylacrylate reacted in a weight ratio of 95:5, 2% of the product of Example I(A), 1% of sulfurized sperm oil, 0.03% of an anti-foam agent, 0.02% of a pour point depressant, and 3% of a viscosity index improver. Another example is an SAE 30 mineral oil composition containing 3% by weight of the same substituted succinic anhydride-polyethylene polyamine reaction product, 0.1% phosphorus as zinc di-(isobutylphenyl)-phosphorodithioate, 10% of chlorinated paraffin wax having a chlorine content of 40% (by weight), 2% of dibutyltetrasulfide, 2% of sulfurized dipentene, and 1.5% of the product of Example VIII. Other compositions are readily available by adding the molybdenum-complexes to presently available lubricating oils and greases or substituting the complexes for all or part of the E.P. and anti-wear additives which may be present in such compositions.

While the foregoing generally describes the use of the mineral lubricating oils and mineral oil-based lubricating greases, it should be understood that the present invention is not limited to such mineral oil-based lubricating compositions. Other lubricating oils, natural as well as synthetic, can be used as the base of the lubricating oil and grease compositions contemplated by the present invention. Such natural and synthetic bases include hydrocarbon oils derived from polymerization of olefins and synthetic oils produced from alkylene oxides such as polyethylene oxide and polypropylene oxide polymers or the esters and ethers thereof. The synthetic ester oils such as those produced from polycarboxylic acids and alcohols, including glycols and polyglycols, are also contemplated as being within the scope of the present invention. Exemplary of these oils are dibutyl adipate, di-(2-ethylhexyl)-sebacate, dilauryl azelate, etc.

In addition to their detergent properties, the products of this invention can be employed to suppress the formation of black exhaust smoke formed during the combustion process in diesel engines. This is accomplished by incorporating into the diesel fuel an amount of the reaction product sufficient to provide the fuel with a sulfate ash content of about 0.01% to about 5% by weight. Preferably, the ash content will be about 0.1% to about 1%.

A product is prepared according to the general procedure of Example I(A) utilizing a weight ratio of overbased material to peptizing agent of 75:25 and employing sufficient ammonium paramolybdate to provide a Ba:Mo molar ratio of 1:1.47 in the reaction mixture. The filtrate contains 21.4% barium and 20.1% molybdenum. This product is incorporated into a diesel fuel in an amount sufficient to produce an ash content of 0.14%. Evaluation of this fuel according to standard smoke suppression evaluation techniques resulted in a test rating of 6.5. The base fuel rating is 7.5. A rating of 0 to 10 is used, 0 indicating no black smoke evolution. Thus, the product reduces smoke evolution by about 13%.

Similarly a product is prepared following the general procedure of Example VII(A) using a weight ratio of overbased acid to peptizing agent of 75:25 and a molar ratio of Ca to $SO_4^=$ of 1.17:1 in the reaction mixture. When employed in a diesel fuel in amounts sufficient to provide sulfate ash contents of 0.14% and 0.28%, the smoke test ratings were 6.0 and 5.5, respectively. The rating for the base fuel is 7.0.

The products of the present invention can also be incorporated into extrudable plastic compositions in amounts of about 0.05 to about 5% by weight. In this environment, the products function as extrusion aids and ultraviolet light stabilizers.

They may also be transformed into gels or greases by thoroughly mixing them with alcohol-water mixtures as disclosed in U.S. Patent 3,242,079. These gels and greases function effectively as lubricants and as thixotropic additives and extrusion aids in plastics, particularly, polyvinyl chloride polymers.

The patents discussed hereinbefore, particularly those dealing with the various compounds useful as peptizing agents, are incorporated herein by reference for their disclosure of these compounds and methods for their preparation to reduce the length of the present specification.

What is claimed is:

1. The process for reacting the polyvalent anions of at least one acidic material selected from the class consisting of inorganic protonic oxy acids and the metal and ammonium salts thereof with at least one basic, carbonated Group II metal-containing organic complex characterized by a metal ratio of at least 1.5 comprising contacting the complex and the anions in the presence of at least one peptizing agent selected from the class consisting of esters, amides, imides, amidines, amine salts and metal salts of aliphatic hydrocarbon-substituted succinic acids having at least about 50 aliphatic carbon atoms in the hydrocarbon substituents at a temperature of at least 20° C. for a period of time sufficient for at least a portion of said anions to react with Group II metal and to displace carbonate, wherein the ratio of equivalents of Group II metal to equivalents of anion is about 1:0.01 to about 1:5.

2. A process according to claim 1 wherein said metal-containing complex is contacted with a molybdate anion.

3. A process according to claim 1 wherein at least one basic, carbonated alkaline earth metal-containing complex dissolved in an inert organic liquid is contacted with an aqueous solution of at least one inorganic acidic material selected from the class consisting of inorganic protonic oxy acids and ammonium salts thereof, wherein the ratio of equivalents of alkaline earth metal-containing complex to equivalents of anion is 1:0.1 to 1:3.

4. A process according to claim 3 wherein the basic carbonated alkaline earth metal-containing complex is a basic, carbonated barium complex of the condensation product of an aliphatic amine and formaldehyde or a formaldehyde producing material.

5. A process according to claim 3 wherein the basic, alkaline earth metal-containing complex is a basic, carbonated barium complex of an oil-soluble organic acid.

6. A process according to claim 3 wherein the basic, carbonated Group II metal-containing organic complex is a basic, carbonated oil-soluble alkaline earth metal complex of at least one non-tautomeric organic compound having at least about 12 aliphatic carbon atoms and selected from the class consisting of sulfoxides, alcohols, esters, and amines.

7. A process according to claim 3 comprising contacting a mineral oil solution of a basic, carbonated barium metal complex of an N-alkyl alkylenediamine having from about 8 to about 40 carbon atoms in the alkyl group and from 2 to 4 carbon atoms in the alkylene group with formaldehyde, and an aqueous solution of ammonium molybdate.

8. A process according to claim 7 wherein the N-alkyl alkylenediamine is N-octadecyl propylenediamine.

9. A process according to claim 3 wherein the inert organic liquid is selected from the group consisting of mineral oil and mixtures of mineral oil and at least one other organic solvent miscible with mineral oil, the weight ratio of mineral oil to other organic solvent being from about 1:20 to about 20:1.

10. A process according to claim 1 comprising contacting (A) an oil solution of an overbased, Group II metal-containing organic complex produced by the process comprising carbonating a mixture comprising
  (a) a mineral oil
  (b) one equivalent of a phenolic composition consisting of a mixture of (1) alkylated phenols having from about 6 to about 200 aliphatic carbon atoms and (2) a condensation product of formaldehyde and an N-alkll alkylenediamine having from about 8 to about 40 carbon atoms in the alkyl radical and from 2 to 4 carbon atoms in the alkylene radical wherein the ratio of equivalents of alkylated phenol to condensation product is within the range of from about 0.1:1 to about 10:1, and
  (c) from about 2 to 15 equivalents of barium as barium oxide, barium hydroxide, or mixtures thereof to form a basic Group II metal-containing complex,
with (B) an aqueous solution of an ammonium molybdate in the presence of a peptizing agent selected from the class consisting of esters, amides, imides, amidines, amine salts, and metal salts of aliphatic hydrocarbon-substituted succinic acid containing at least about 50 aliphatic carbon atoms in the hydrocarbon substituents, while maintaining a temperature in the range of about 20° C. to about 100° C. for a period of time sufficient for at least a portion of carbonate to be displaced, from the complex.

11. The composition produced by the process of claim 1.
12. The composition produced by the process of claim 2.
13. The composition produced by the process of claim 3.
14. The composition produced by the process of claim 4.
15. The composition produced by the process of claim 10.
16. The composition produced by the process of claim 5.
17. The composition produced by the process of claim 6.
18. The process for reacting the polyvalent anions of at least one acidic material selected from the class consisting of inorganic protonic oxy acids and the metal and ammonium salts thereof with at least one basic, carbonated Group II metal-containing organic complex characterized by a metal ratio of at least two comprising contacting the complex and the anions in the presence of at least one peptizing agent selected from the class consisting of N-alkyl alkylenediamines and the condensation products thereof with lower aliphatic aldehydes wherein the N-alkyl alkylenediamine contains from about 8 to 40 carbon atoms and from 2 to 4 carbon atoms in the alkylene group, at a temperature of at least about 20° C. for a period of time sufficient for at least a portion of said anions to reaction with Group II metal and to displace carbonate, the ratio of equivalents of metal-containing complex to anions being about 1:0.01 to about 1:5, with the proviso that when said metal-containing organic complex is one derived from N-alkyl alkylenediamines and condensation products thereof with lower aliphatic aldehydes, an excess of said N-alkyl alkylenediamine or condensation product thereof with a lower aliphatic aldehyde is employed the peptizing agent.
19. The process according to claim 18 wherein the metal-containing organic complex is a basic, carbonated alkaline earth metal complex.
20. The composition produced by the process of claim 18.
21. The composition produced by the process of claim 19.

References Cited

UNITED STATES PATENTS

| | | | |
|---|---|---|---|
| 2,617,049 | 11/1952 | Asseff et al. | 252—42.7 X |
| 2,623,016 | 12/1952 | Mertes | 252—42.7 X |
| 3,140,997 | 7/1964 | Price | 252—33 |
| 3,223,625 | 12/1965 | Cyphers et al. | 252—49.7 X |
| 3,256,183 | 6/1966 | Greenwald | 252—42.7 X |
| 3,259,575 | 7/1966 | Millet et al. | 252—42.7 X |
| 3,272,743 | 9/1966 | Norman et al. | 252—42.7 X |
| 3,290,245 | 12/1966 | Elliott et al. | 252—49.7 X |

DANIEL E. WYMAN, Primary Examiner

W. CANNON, Assistant Examiner

U.S. Cl. X. R.

252—18, 40.7, 42.1, 42.7